(12) United States Patent
Heymel et al.

(10) Patent No.: US 12,516,728 B2
(45) Date of Patent: Jan. 6, 2026

(54) OIL COLLECTING PAN FOR A PLANETARY GEARBOX

(71) Applicant: Schaeffler Technologies AG & Co. KG, Herzogenaurach (DE)

(72) Inventors: Jan Heymel, Erlangen (DE); Alfred Hock, Aisch (DE); Frederic Fischer, Weisendorf (DE); Reinhard Rehner, Nuernburg (DE); Michael Keck, Brunn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/689,986

(22) PCT Filed: Aug. 10, 2022

(86) PCT No.: PCT/DE2022/100585
§ 371 (c)(1),
(2) Date: Mar. 7, 2024

(87) PCT Pub. No.: WO2023/036355
PCT Pub. Date: Mar. 16, 2023

(65) Prior Publication Data
US 2024/0426375 A1    Dec. 26, 2024

(30) Foreign Application Priority Data
Sep. 7, 2021   (DE) ............... 10 2021 123 096.9

(51) Int. Cl.
*F16H 57/04* (2010.01)
*F16H 57/08* (2006.01)

(52) U.S. Cl.
CPC ..... *F16H 57/0479* (2013.01); *F16H 57/0427* (2013.01); *F16H 57/043* (2013.01);
(Continued)

(58) Field of Classification Search
CPC ............ F16H 57/0479; F16H 57/0427; F16H 57/043; F16H 57/0452; F16H 57/0486; F16H 57/082
(Continued)

(56) References Cited

U.S. PATENT DOCUMENTS 7,967,713 B2 * 6/2011 Haupt ................. F16C 33/6677
475/160
10,794,469 B2 * 10/2020 Bradley ................ F16H 57/045
(Continued)

FOREIGN PATENT DOCUMENTS

DE       19736688 A1    2/1999
DE    102005054084 A1    7/2007
(Continued)

*Primary Examiner* — Roger L Pang

(57) ABSTRACT

An oil collecting pan for a planetary gearbox includes a pan body and a retaining plate. The pan body includes a channel-like oil collection space and axially protruding, hollow oil feed ports which communicate with the channel-like oil collection space. The retaining plate extends radially into the channel-like oil collection space and runs at least partially circumferentially through the channel-like oil collection space. The retaining plate forms an oil retaining space within the channel-like oil collection space.

7 Claims, 2 Drawing Sheets

(52) U.S. Cl.
CPC ..... *F16H 57/0452* (2013.01); *F16H 57/0486* (2013.01); *F16H 57/082* (2013.01)

(58) Field of Classification Search
USPC ................ 475/159, 331, 348; 184/6.12, 11.2
See application file for complete search history.

(56) References Cited

U.S. PATENT DOCUMENTS

| | | | |
|---|---|---|---|
| 11,754,170 B1 * | 9/2023 | Park ................... | F16H 57/0423 184/6.12 |
| 2006/0223664 A1 * | 10/2006 | Duong ................ | F16H 57/0482 475/159 |
| 2019/0085972 A1 | 3/2019 | Uhkoetter et al. | |
| 2019/0323596 A1 * | 10/2019 | Olson ................. | F16H 57/0494 |
| 2024/0401692 A1 | 12/2024 | Heymel et al. | |

FOREIGN PATENT DOCUMENTS

| | | | |
|---|---|---|---|
| DE | 102018123592 A1 | 3/2020 | |
| DE | 102019108050 A1 | 10/2020 | |
| EP | 2317181 A1 | 5/2011 | |
| EP | 3106714 A2 | 12/2016 | |
| EP | 3560829 A1 | 10/2019 | |
| JP | 2010041887 A | 2/2010 | |
| JP | 2010071400 A | 4/2010 | |
| JP | 2014181793 A | 9/2014 | |
| JP | 2015102193 A | 6/2015 | |

\* cited by examiner

OIL COLLECTING PAN FOR A PLANETARY GEARBOX

CROSS-REFERENCE TO RELATED APPLICATIONS

This application is the United States National Phase of PCT Appln. No. PCT/DE2022/100585 filed Aug. 10, 2022, which claims priority to German Application No. DE102021123096.9 filed Sep. 7, 2021, the entire disclosures of which are incorporated by reference herein.

TECHNICAL FIELD

The present disclosure relates to an oil collecting pan for a planetary gearbox, having a pan body which has a channel-like oil collection space and a plurality of axially protruding, hollow oil feed ports which communicate with the oil collection space.

BACKGROUND

Planetary gearboxes are used in a wide variety of applications. They are used, for example, in vehicle transmissions, such as hybrid transmissions. A planetary gearbox has a planetary carrier on which a plurality of planetary pins is arranged, on which planetary gears are rotatably mounted via suitable bearings, usually rolling bearings in the form of needle bearings. The externally toothed planetary gears mesh with an internally toothed ring gear in a manner known per se. A corresponding lubricant device or lubricant supply is provided to supply lubricant to the bearings of the planetary gears. On the one hand, this device comprises a channel structure provided on the central shaft, for example a channel running along the shaft axis, from which a further channel branches off radially, which opens on the outside of the shaft.

An oil collecting pan is further provided, which has an oil collection space for the lubricating oil that is fed in via the channel and escapes therefrom or is thrown outwards therefrom. The oil is therefore collected in the oil collection space. A number of oil feed ports corresponding to the number of planetary pins, i.e., axial ports that have a through bore, for example, extend from the bottom of the oil collecting pan. The oil feed ports communicate with the oil collection space and with a channel structure provided in each planetary pin, which usually includes a channel extending along the longitudinal axis of the pin, into which the respective oil feed port engages, and a branch channel branching off radially therefrom, which leads to the bearing. The oil coming from the oil collection space is fed to the planetary pin-side channel structure via the respective feed port and flows to the planetary gear bearing via the pin-side channel structure. Such an oil collecting pan with an oil collection space and corresponding oil feed port, which is fixed to a planetary carrier via an axial bearing with an associated axial bearing washer, is known, for example, from DE 10 2005 054 084 A1.

The channel structure of the shaft often only has one radially extending channel opening on the outside of the shaft, through which the oil is discharged to the outside. As a result, the oil is only applied locally at one point, which means that there is no even distribution around the shaft circumference. This means that there is also no homogeneous oil distribution in the oil collection space as viewed around the circumference, which in turn means that the oil flow to the individual feed ports is also not uniform due to this inhomogeneity. Due to the fixed positional relationship of the oil collecting pan, on the one hand, to the planetary carrier or the planetary pins and, on the other hand, to the shaft, more oil often collects in the region of the oil collection space that is adjacent to or in extension of the shaft-side channel than in regions offset in the circumferential direction and in particular the opposite region. This in turn means that the oil feed port that is positioned closest to the opening of the shaft-side channel, as viewed in the circumferential direction, is supplied with a larger amount of oil than the oil feed ports that are arranged offset thereto in the circumferential direction.

The inhomogeneous lubricant supply over the shaft could be counteracted by providing a plurality of radial channels around the shaft circumference so that the lubricant is delivered at a plurality of positions as viewed in the circumferential direction. Ideally, the number of channels would correspond to the number of oil feed ports and thus planetary pins. However, not least for reasons of strength in relation to the shaft, the formation of a plurality of such channels is not always practical, which is why often only one radially extending channel is provided. The inhomogeneous oil supply results in different levels of lubrication of the respective bearings, which is reflected in the differing temperature behavior of the planetary pins.

DE 10 2018 123 592 A1 discloses an oil collecting pan for a planetary gearbox with a pan body that is delimited on the outer circumference by a channel-like oil collection space. A number of oil feed ports corresponding to the number of planetary pins extend from the oil collecting pan. The oil collection space is divided into sections, which are separated from one another on the circumference by a partition wall.

DE 10 2019 108 050 A1 discloses a lubrication device, the oil collecting pan of which provides the oil feed ports and fastening means for fastening the oil collecting pan to a planetary carrier. The width of the oil collecting pan varies and becomes narrower towards the oil feed ports. In addition, the oil collecting pan has one partition wall each in the region of the pipe sockets, which divides the oil collecting pan into two sections.

SUMMARY

An oil collecting pan of the type mentioned at the outset, includes at least one retaining plate extending radially into the oil collection space and running at least in sections around the circumference, by means of which retaining plate an oil retaining space is formed within the oil collection space.

The oil collecting pan according to the disclosure includes an oil retaining space additionally integrated in the oil collection space, which already serves to collect and accumulate a corresponding amount of oil or an oil supply, which serves to always accumulate a corresponding amount of oil defined by the size of the retaining space and to retain it as a type of reservoir. This oil retaining space is implemented by means of at least one annular retaining plate, which slightly extends radially into the oil collection space, i.e., runs virtually inwards from the inside of the channel-like oil collection space in a partially annular manner or in an annular manner. The retaining plate therefore forms a kind of web that protrudes into the oil collection space. In relation to the direction of inflow of the oil output by the shaft and collected by the pan, a partially annular space or fully annular space adjacent to the direction of inflow is now formed via this web, into which the oil or a large part of the oil initially flows. The oil is initially retained there and therefore does not flow over this retaining plate, i.e., the retaining web, but initially remains in the oil retaining space in which it is distributed around the circumference. Only when the oil retaining space is filled, i.e., a sufficiently large oil reservoir has been built up in it, can the oil flow over the retaining plate and thus out of the oil retaining space and into the oil feed ports.

The retaining plate and thus the formation of the oil retaining space therefore prevents a large part of the oil flowing in from flowing directly into the oil feed port adjacent in the direction of inflow, resulting in less oil being fed to the oil feed ports following in the circumferential direction. Rather, the formation of the oil retaining space allows for a uniform flow of oil to the individual oil feed ports, as a minimum amount of oil is always retained in the oil retaining space via the oil retaining space and the oil can only flow over the plate when the oil retaining space is full, though this then occurs in a largely uniform manner over the length of the plate. As a result, all planetary gear bearings are supplied with almost the same amount of oil, so that the lubrication and cooling of the individual bearing points is largely uniform and the temperature development in the bearing regions is also largely uniform.

The retaining plate can only extend in sections around the circumference of the oil collection space or the pan body. In this regard, the positioning can be selected taking into consideration the flow behavior of the oil when it enters the oil collecting pan and during distribution in the oil collection space. If a preferred flow direction is established during operation due to the direction of rotation of the oil collecting pan, the direction in which the retaining plate extends in the circumferential direction, as well as the extension length, can be determined taking this behavior into consideration. Naturally, the retaining plate extends in front of the oil feed port, which in the assembly position is positioned adjacent to the shaft-side channel from which the oil is thrown out, as a direct flow into this oil feed port is to be prevented. How far the plate then runs in one direction or the other, and consequently how far the oil retaining space extends, can be defined as described, taking into consideration various design parameters such as the oil flow, but also the distance between the next adjacent oil feed ports, etc.

If an oil collecting pan with only a partially circumferential plate, i.e., an oil retaining space that only extends partially around the circumference, is used, care must be taken during assembly to ensure that the oil collecting pan is mounted on the planetary carrier in a certain defined orientation. This is because it must be ensured that the oil collecting pan is oriented in such a way that the retaining plate and thus the oil retaining space is positioned correctly in relation to the shaft-side outlet channel. In order to avoid such an orientation, which is to be observed during assembly, it is conceivable that the retaining plate runs around the entire circumference. This means that the retaining plate extends around the entire circumference or oil collection space and, as a result, the oil retaining space also constitutes a channel-like, circumferential retaining channel. The oil therefore accumulates around the entire circumference of the pan and not just partially. For this reason, the oil collecting pan can be mounted on the planetary carrier in any orientation with this embodiment of the pan.

In this context, it is conceivable that the width of the retaining plate changes around the circumference. This means that the retaining plate extends different distances into the oil collection space and, consequently, the channel-like retaining space is, effectively, of differing depth. For example, the plate can be slightly higher in the region of the oil inlet, i.e., the region adjacent to the shaft-side outlet channel, and steadily decrease in height towards one or both sides. As a result, the plate is slightly higher in the region adjacent to the first oil feed port, which is adjacent to the shaft-side outlet channel, and slightly lower in the regions adjacent to further oil feed ports following in the circumferential direction. This means that the retention threshold, which must be exceeded to feed the oil into the respective oil feed port, is slightly higher in the region of the first oil feed port than in the region of the subsequent oil feed ports. Since, as described, the oil primarily flows in in the region of the first oil feed port, there will always be slightly more oil there. The different heights can therefore ensure that the oil in this region, because the plate is slightly higher there, is retained a little more than in the regions following in the circumferential direction. Nevertheless, the retaining plate is overflowed everywhere within a small time window so that all oil feed ports are supplied in a uniform manner. Even with this embodiment, the oil collecting pan would have to be positioned correctly during assembly, despite the circumferential retaining plate.

Alternatively, as described, it is also conceivable that the plate extends only around a circumferential section and reaches over at least one opening leading to an oil feed port, and this oil feed port is then positioned adjacent to the shaft-side outlet channel in the assembly position. In this regard, the retaining plate can extend to both sides of the opening, i.e., be extended on both sides, and the lateral extension on both sides can be the same or different, as already described above.

The retaining plate, viewed axially, may be positioned closer to a bottom wall of the pan body, from which the oil feed ports extend, than to an opposite wall. This can serve to form a relatively large retaining reservoir that first has to fill up before an overflow is possible. On the one hand, this allows for a correspondingly high reservoir amount to be defined, and on the other hand, as the remaining collection space is correspondingly smaller and therefore also the distance to the opening of the respective oil feed port is smaller, the oil can also flow relatively quickly into the oil feed port at the onset of the overflow.

In addition to the oil collecting pan itself, the present disclosure also relates to a planetary gearbox, including a shaft which has a channel structure for guiding oil, a channel opening on the outside of the shaft, a planetary carrier, at least two planetary pins arranged on the planetary carrier, and an oil collecting pan for collecting the oil fed via the shaft-side channel as described above. A planetary gear is mounted on each planetary pin, and each planetary pin has a channel structure for feeding the oil to the bearing of the planetary gear. The oil collecting pan has at least two hollow oil feed ports, each opening into a planetary pin-side channel structure, for feeding the oil into the respective channel structure. The oil collecting pan is fixed to the planetary carrier via suitable means, for example via corresponding snap-in hooks or snap-in sections formed on the oil collecting pan made of plastic, which engage in corresponding latching receptacles or latching sections on the planetary carrier, or via an adjacent axial bearing arrangement, via which the planetary carrier is axially supported and mounted and which also simultaneously fixes the oil collecting pan.

If an oil collecting pan with a circumferential retaining plate is used, with a retaining plate varying in width, the oil collecting pan is positioned in such a way that the region of the greatest width, viewed in the circumferential direction, covers the opening of the shaft-side channel. This means that the oil collecting pan is positioned and mounted such that the region where the retaining plate is at its widest is adjacent to the shaft-side channel opening, as viewed axially.

If an oil collecting pan with a retaining plate that only partially extends around the circumference is used, the oil collecting pan is positioned in such a way that the retaining plate, viewed in the circumferential direction, covers the opening of the shaft-side channel. In this case, too, a position-oriented installation is necessary so that the retaining plate is located, as viewed axially, adjacent to or practically behind the channel opening.

BRIEF DESCRIPTION OF THE DRAWINGS

The disclosure is explained below on the basis of exemplary embodiments with reference to the drawings. The drawings are schematic representations, in which.

DETAILED DESCRIPTION

Figure 1:
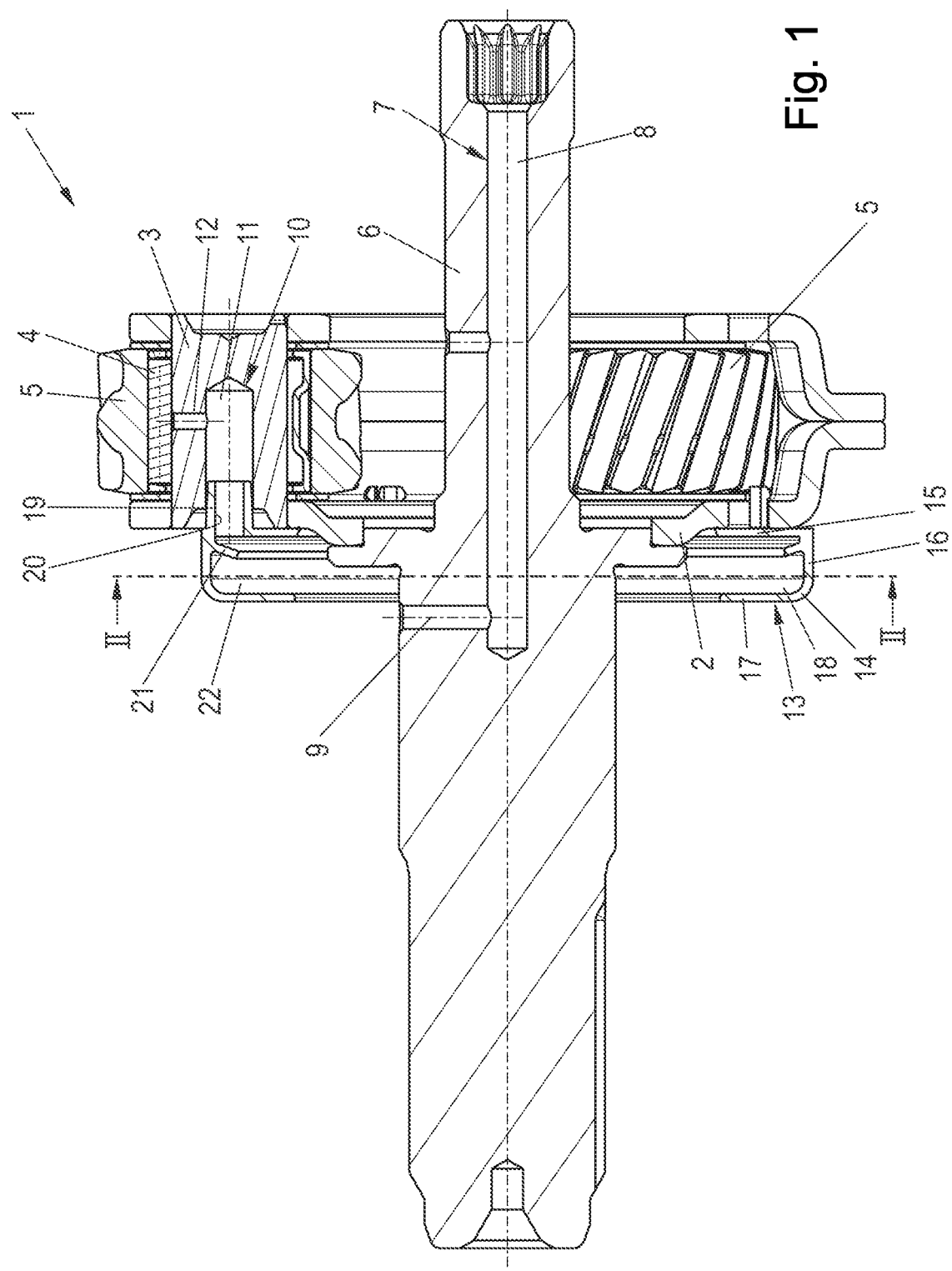
FIG. 1 shows a longitudinal sectional view of a planetary gearbox with an oil collecting pan according to the disclosure.

FIG. 1 shows a planetary gearbox 1 according to the disclosure, with a planetary carrier 2 on which a plurality of planetary pins 3 is arranged, on which externally toothed planetary gears 5 are arranged and rotatably mounted via corresponding bearings 4, usually needle bearings. The planetary carrier 2 is firmly connected to a shaft 6.

An oil supply device is provided in order to supply the bearings 4 with oil, i.e., to lubricate and cool them. On the one hand, this device includes a channel structure 7 formed on the shaft 6 with an axially extending channel 8 in the form of a blind bore and with a channel 9 branching off from this and extending radially, which opens on the outside of the shaft. Oil is supplied via this channel structure 7 via the shaft 6 and discharged radially outwards or rather, as the shaft 6 rotates, is thrown outwards.

Each planetary pin 3 also has a channel structure 10, with an axially extending channel 11 in the form of a blind bore, as well as a channel 12 branching off from it and extending radially, which opens out below the bearing 4. Lubricating oil can be fed directly to the bearing 4 via this channel structure 10.

An oil collecting pan 13, usually a plastic component, is provided to guide the oil from the outlet of the channel 9 to the inlet of the channel 11. This pan has a pan body 14 with a bottom 15, a circumferential side wall 16 and a wall 17 opposite the bottom 15. An oil collection space 18 is defined by the bottom 15 and the walls 16, 17, in which oil escaping from the channel 9 is collected and from which it is fed to the channel structure 10.

To make this possible, a number of oil feed ports 19 corresponding to the number of planetary pins 3 are provided on the bottom 15, which are hollow ports with a corresponding axial bore 20. The bores 20 communicate, on the one hand, with the oil collection space 18 and, on the other hand, due to the engagement of the respective oil feed ports 19 in a respective channel 11, also with the channel 11 or with the channel structure 10. The oil collecting pan 13 is fastened to the planetary carrier 2, for example via snap-in connections, and therefore rotates with the planetary carrier 3 and thus also with the shaft 6. This means that the relative position of the channel 9 or rather its opening to the individual oil feed ports 19 always remains the same.

Figure 2:
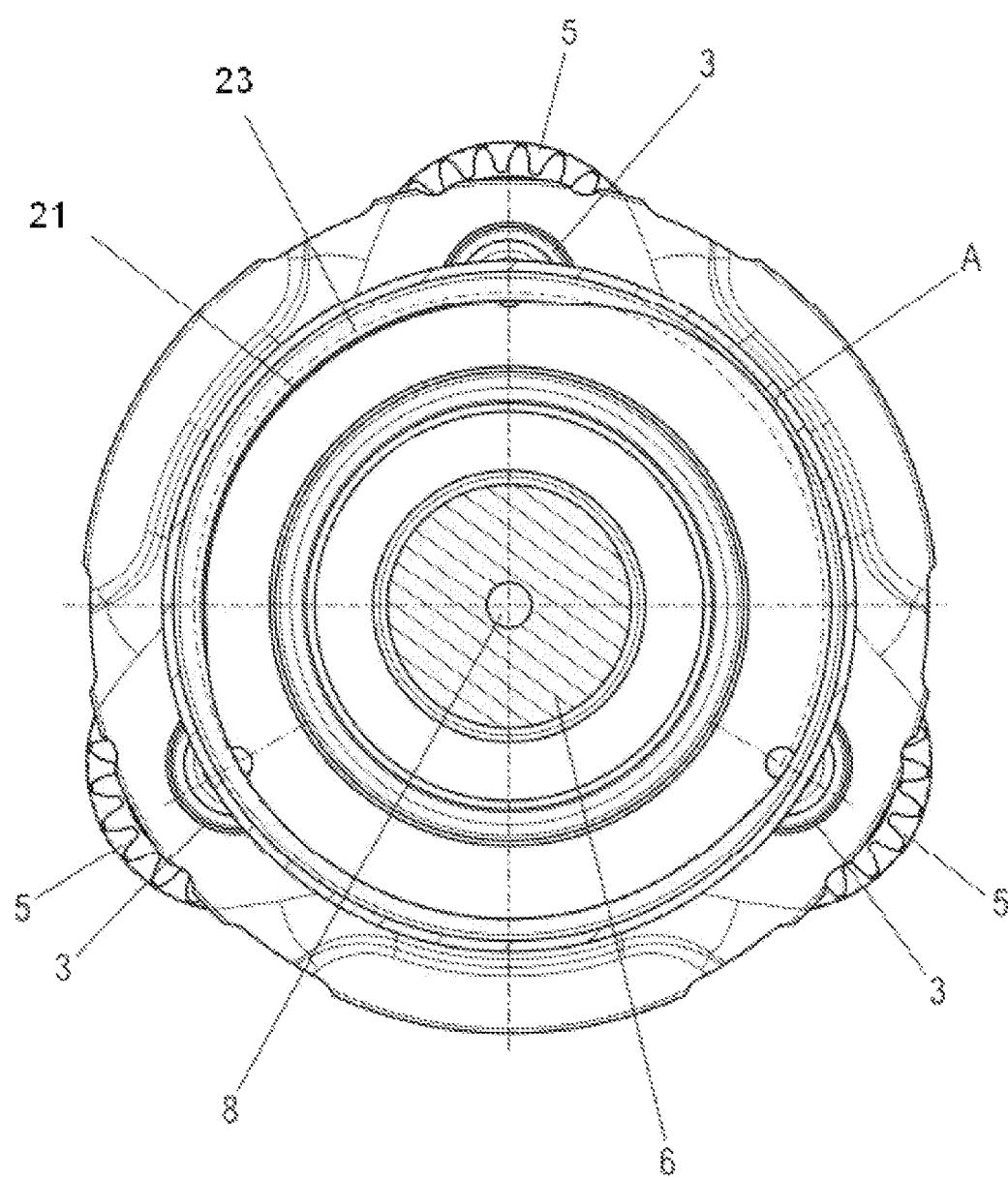
FIG. 2 shows a cross-sectional view along plane II-II from FIG. 1.

The wall 17 is annular and open, as viewed axially, which means that oil discharged from the channel 9 can enter the oil collection space 18 via this annular opening and be collected there. It is apparent that the opening of the channel 9, as viewed axially and in the circumferential direction, is adjacent to the oil feed port 19 shown at the top in FIG. 1, while the two other oil feed ports 19 are positioned offset thereto by 120° in the circumferential direction, i.e., they are arranged relatively far away from the point of inflow of the oil into the oil collecting pan 13. Three planetary pins 3 are therefore provided, see also FIG. 2 in this regard, each with a planetary gear 5, which is why three oil feed ports 19 are inevitably provided. The fixed positional relationship of the three planetary pins 3 and thus also of the oil feed ports 19 relative to the channel 9, despite rotation during operation, can also be seen in FIG. 2. This figure shows a cross-sectional view along the line II-II from FIG. 1. The channel 9, which is not shown in detail, extends vertically upwards from the central channel 8 of the shaft 6 according to the representation, i.e., it opens adjacent to the oil feed port positioned above it as shown in FIG. 2. The oil feed ports 19, which are positioned offset thereto by 120° in the circumferential direction, are relatively far away from this.

Since only one channel 9 is provided, oil only flows into the oil collecting pan 13 in this region. As a result, if no corresponding means according to the disclosure were to be provided, most of the oil flowing in would flow out directly via the oil feed port 19, which is directly adjacent axially and in the circumferential direction and is shown at the top in the representation, while less oil would reach the offset oil feed ports 19. In order to prevent this, a retaining plate 21 is provided according to the disclosure, which extends radially into the oil collection space 18 in a web-like manner and via which an oil retaining space 22 is formed within the oil collection space 18. As FIG. 2 shows, the retaining plate 21 extends completely around the circumference of the pan body 14 or the channel-like oil collection space 18. However, the plate varies in width, i.e., it protrudes into the oil collection space 18 to different extents at different positions.

As FIG. 2 shows, the retaining plate 21 widens steadily in a counterclockwise direction starting at point A and practically reaches its maximum width immediately in front of the upper oil feed port 19, which it retains for a short distance before steadily decreasing in width again. The width is already slightly reduced in front of the second oil feed port, which follows the upper oil feed port 19 in a counterclockwise direction, as viewed in the circumferential direction. A further reduction in width then occurs towards the oil feed port 19 shown on the right, before the retaining plate 21 returns to its minimum width at point A. This variation in width can be easily recognized by comparison with the pitch circle 23, which shows the position of the bores 20 of the oil feed ports 19. The width varies, or rather the course of the inner edge of the retaining plate 21 does with respect to the pitch circle 23.

As described, the retaining plate 21 defines an annular retaining space 22 in which the inflowing oil initially accumulates. An oil reservoir is thus formed thereby, which must first fill the oil retaining space 22 before it can flow over the retaining plate 21 and flow to the individual oil feed ports 19. Particularly in the region of the upper oil feed port 19, which is adjacent to the channel 9, this prevents the oil from flowing directly into this oil feed port 19. Instead, it first flows against the retaining plate 21 and is distributed along it in the oil retaining space 22.

The varying plate height takes account of the fact that the oil flows into the region of the oil feed port 19 adjacent to the channel 9 and, as a result, there is always slightly more oil there than in the regions adjoining in the circumferential direction. Due to the varying plate height, it is possible for the oil to ultimately flow uniformly over the entire plate length over the retaining plate 21, so that a largely uniform oil supply to the individual bearings 4 is achieved.

While in the exemplary embodiment shown the retaining plate 21 runs around the entire circumference of the pan body 14, it would also be conceivable to have it run around only partially. This means that in the region A, where the retaining plate 21 is at its minimum width, the retaining plate 21 could also run completely into the side wall 16. Furthermore, in the example shown, the retaining plate 21 is located adjacent to the bottom 15, so that a relatively wide oil retaining space 22 is formed, as viewed axially. Of course, the retaining plate 21 could also be provided at a different axial position.

REFERENCE NUMERALS

1 Planetary gearbox
2 Planetary carrier
3 Planetary pin
4 Bearing
5 Planetary gear
6 Shaft
7 Channel structure
8 Channel
9 Channel
10 Channel structure
11 Channel
12 Channel
13 Oil collecting pan
14 Pan body
15 Bottom
16 Side wall
17 Wall
18 Oil collection space
19 Oil feed port
20 Axial bore
21 Retaining plate
22 Oil retaining space
23 Pitch circle

The invention claimed is:

1. An oil collecting pan for a planetary gearbox, comprising:
   a pan body which has a channel-like oil collection space and a plurality of axially protruding, hollow oil feed ports which communicate with the oil collection space, and
   a retaining plate extending radially into the oil collection space and running around an entire circumference of the retaining plate, by means of which retaining plate an oil retaining space is formed within the oil collection space, wherein a width of the retaining plate changes around the circumference of the retaining plate.

2. The oil collecting pan according to claim 1, wherein the retaining plate, viewed axially, is positioned closer to a bottom wall of the pan body, from which the oil feed ports extend, than to an opposite wall.

3. A planetary gearbox, comprising a shaft which has a channel structure for guiding oil, comprising a shaft-side channel opening on an outside of the shaft, a planetary carrier, at least two planetary pins arranged on the planetary carrier, on each of which planetary pins a planetary gear is mounted, wherein each planetary pin has a channel structure for feeding the oil to a bearing of the planetary gear, and an oil collecting pan for collecting the oil fed via the shaft-side channel according to claim 1, comprising at least two hollow oil feed ports, each opening into a planetary pin-side channel structure, for feeding the oil into the respective channel structure.

4. The planetary gearbox according to claim 3, wherein the oil collecting pan is positioned in such a way that a region of a greatest width of the retaining plate, viewed in a circumferential direction, covers the opening of the shaft-side channel.

5. An oil collecting pan for a planetary gearbox, comprising:
   a pan body comprising:
      a channel-like oil collection space; and
      a plurality of axially protruding, hollow oil feed ports which communicate with the channel-like oil collection space; and
   a retaining plate extending radially into the channel-like oil collection space and running at least partially circumferentially through the channel-like oil collection space, the retaining plate forming an oil retaining space within the channel-like oil collection space, wherein:
      the retaining plate runs fully circumferentially; and
      a width of the retaining plate changes around a circumference of the retaining plate.

6. The oil collecting pan of claim 5, wherein:
   the pan body further comprises:
      a bottom wall, the hollow oil feed ports extending therefrom; and
      an opposite wall, axially opposite the bottom wall; and
   the retaining plate, when viewed in a section extending through an axis of the oil collecting pan, is positioned closer to the bottom wall than to the opposite wall.

7. A planetary gearbox, comprising:
   a shaft comprising a shaft channel structure for guiding oil, the channel structure comprising a shaft-side channel opening on an outside of the shaft;
   a planetary carrier;
   at least two planetary pins arranged on the planetary carrier;
   a gear mounted on each of the at least two planetary pins, each gear comprising a bearing; and
   an oil collecting pan for collecting the oil fed via the shaft-side channel, wherein:
      each of the at least two planetary pins comprises a planetary pin channel structure for feeding the oil to the bearing of the respective gear,
      the oil collecting pan comprises:
         a pan body comprising a channel-like oil collection space and a plurality of axially protruding, hollow oil feed ports which communicate with the channel-like oil collection space and open into a respective planetary pin channel structure; and
         a retaining plate extending radially into the channel-like oil collection space and running at least in sections around a circumference of the retaining plate to form an oil retaining space within the channel-like oil collection space, a region of a greatest width of the retaining plate, viewed in a circumferential direction, covering the shaft-side channel opening.

* * * * *